United States Patent
Edwards, Jr. et al.

(10) Patent No.: US 7,335,033 B1
(45) Date of Patent: Feb. 26, 2008

(54) COUPLING A SMALL FORM FACTOR TRANSCEIVER TO A CIRCUIT BOARD MODULE USING A FORM FACTOR CONVERTER

(75) Inventors: William F. Edwards, Jr., Livermore, CA (US); Van Nguyen, San Jose, CA (US); Gary McLeod, Flagstaff, AZ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/601,028

(22) Filed: Nov. 17, 2006

Related U.S. Application Data

(60) Provisional application No. 60/853,139, filed on Oct. 20, 2006.

(51) Int. Cl.
*H01R 12/00* (2006.01)
(52) U.S. Cl. .................. 439/76.1; 439/607; 439/638
(58) Field of Classification Search ............... 439/76.1, 439/353, 354, 357, 607, 638
See application file for complete search history.

(56) References Cited

U.S. PATENT DOCUMENTS

| | | | |
|---|---|---|---|
| 5,094,623 A * | 3/1992 | Scharf et al. ............... | 439/101 |
| 5,125,849 A * | 6/1992 | Briggs et al. ............... | 439/378 |
| 5,375,040 A * | 12/1994 | Cooper et al. ............. | 361/730 |
| 5,397,242 A * | 3/1995 | Laisne et al. .............. | 439/101 |
| 5,797,771 A * | 8/1998 | Garside ...................... | 439/610 |
| 6,822,879 B2 * | 11/2004 | Rathnam et al. ........... | 361/818 |
| 6,893,270 B2 * | 5/2005 | Sercu ........................ | 439/76.1 |
| 7,175,444 B2 * | 2/2007 | Lang et al. ................ | 439/76.1 |

* cited by examiner

*Primary Examiner*—Khiem Nguyen
(74) *Attorney, Agent, or Firm*—BainwoodHuang

(57) ABSTRACT

A system includes a circuit board module having a device mounting section. The system further includes a small form factor transceiver and a form factor converter. The form factor converter is configured to concurrently connect to (i) the circuit board module and (ii) the small form factor transceiver. The form factor converter includes an exterior portion defining a large form factor (e.g., the standard X2 form factor) to fit within the device mounting section of the circuit board module when the form factor converter connects to the circuit board module, and an interior portion defining a small form factor (e.g., the standard SFP form factor) location to receive at least a portion of the small form factor transceiver when the form factor converter connects to the small form factor transceiver.

9 Claims, 7 Drawing Sheets

COUPLING A SMALL FORM FACTOR TRANSCEIVER TO A CIRCUIT BOARD MODULE USING A FORM FACTOR CONVERTER

CROSS REFERENCE TO RELATED APPLICATIONS

This patent application is related to U.S. Patent Application No. 60/853,139 filed on Oct. 20, 2006, entitled, "COUPLING A SMALL FORM FACTOR TRANSCEIVER TO A CIRCUIT BOARD MODULE USING A FORM FACTOR CONVERTER", the contents and teachings of which are hereby incorporated by reference in their entirety.

BACKGROUND

In general, a fiber optic transceiver is a communications device having an optical interface and an electrical interface. The optical interface transmits and receives fiber optic signals (e.g., through a set of fiber optic cables). The electrical interface transmits and receives electrical signals (e.g., through a circuit board connector mounted to a printed circuit board or PCB).

X2 is a standard for an "off-the-shelf" fiber optic transceiver package which is optimized for IEEE 822.3ae Ethernet communications. To connect an X2 fiber optic transceiver to a PCB, a user slides the X2 fiber optic transceiver into a specialized rigid frame or rail which is mounted to the PCB. An electrical connector of the X2 fiber optic transceiver engages an electrical circuit board connector mounted to the PCB thus electrically connecting the X2 fiber optic transceiver to the PCB. The X2 standard is outlined in a Multi-Source Agreement (MSA) which is supported by several leading networking component suppliers.

Small-form factor pluggable (SFP) is another standard for an "off-the-shelf" fiber optic transceiver package which is optimized for high-speed Fibre Channel applications (e.g., 4 Gb/s communications). To connect an SFP fiber optic transceiver to a PCB, a user slides the SFP fiber optic transceiver into a specialized electrical circuit board connector which is mounted to the PCB. An electrical connector of the SFP fiber optic transceiver engages the electrical circuit board connector thus electrically connecting the SFP fiber optic transceiver to the PCB. In general, the form factor of an SFP fiber optic transceiver is smaller than that of an X2 fiber optic transceiver.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

A form factor converter couples a small form factor transceiver to a circuit board mounting location which is configured to directly connect to a larger form factor device. For example, such a converter is capable of coupling an SFP device (e.g., an SFP fiber optic transceiver) to a standard X2 mounting location. As a result, circuit board modules having one or more large form factor mounting locations can now easily work with smaller form factor standard devices (e.g., SFP fiber optic transceivers) even though such mounting locations are configured to directly connect to physically larger form factor standard devices (e.g., X2 fiber optic transceivers).

One embodiment is directed to a system including a circuit board module having a device mounting section. The system further includes a small form factor transceiver and a form factor converter. The form factor converter is configured to concurrently connect to (i) the circuit board module and (ii) the small form factor transceiver. The form factor converter includes an exterior portion defining a large form factor (e.g., the standard X2 form factor) to fit within the device mounting section of the circuit board module when the form factor converter connects to the circuit board module, and an interior portion defining a small form factor (e.g., the standard SFP form factor) location to receive at least a portion of the small form factor transceiver when the form factor converter connects to the small form factor transceiver.

DESCRIPTION OF EXAMPLE EMBODIMENTS

Figure 1:
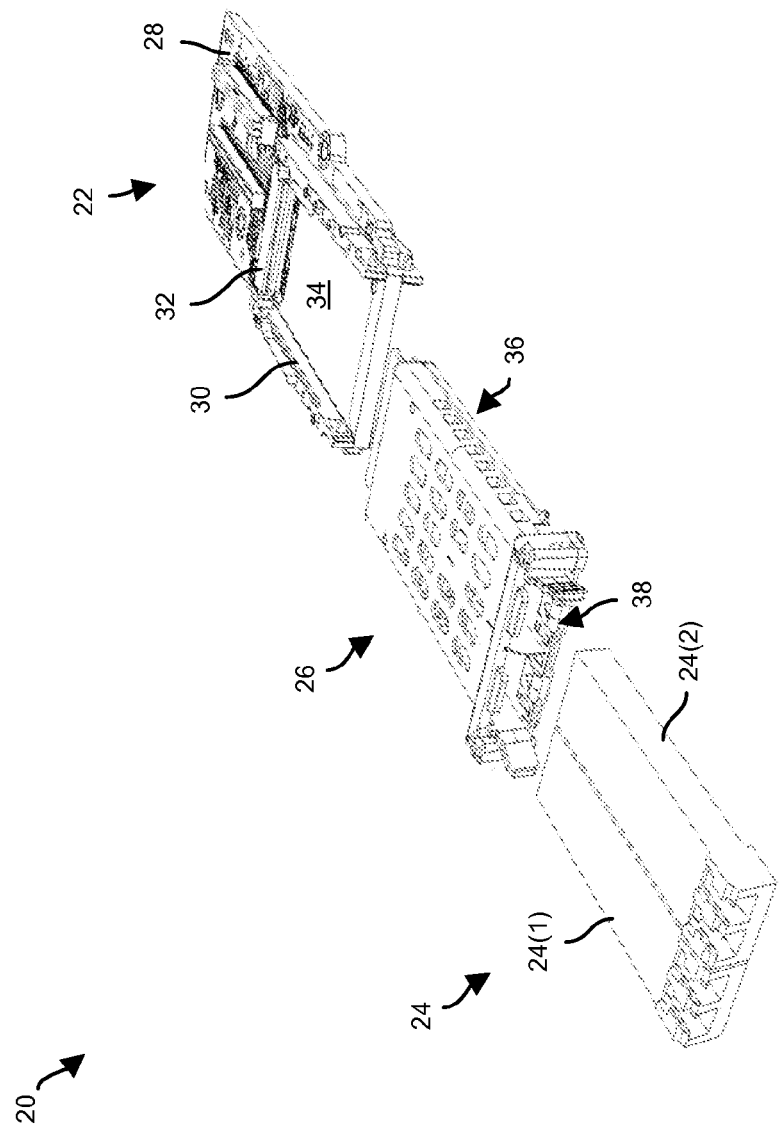
FIG. 1 is a perspective view of a system which utilizes a form factor converter enabling SFP devices to connect to an X2 mounting location on a circuit board module.

FIG. 1 shows a system 20 having a circuit board module 22, a set of SFP fiber optic transceivers 24(1), 24(2) (collectively, SFP transceivers 24) and a form factor converter 26. The circuit board module 22 includes a circuit board 28, a metallic rail 30 and an electrical connector 32 which form an X2 device mounting section 34 configured to receive and connect with a single X2 fiber optic transceiver. Optionally, the circuit board module 22 includes multiple X2 device mounting sections 34 (a second X2 device mounting section 34 is shown on the opposite side of the circuit board 28).

As shown in FIG. 1, an exterior portion 36 of the form factor converter 26 defines an X2 form factor to fit within X2 device mounting section 34. Furthermore, an interior portion 38 of the form factor converter 26 defines multiple SFP form factor receiving locations to receive portions of the SFP transceivers 24. Further details will now be provided with reference to FIGS. 2 through 4.

Figure 2:
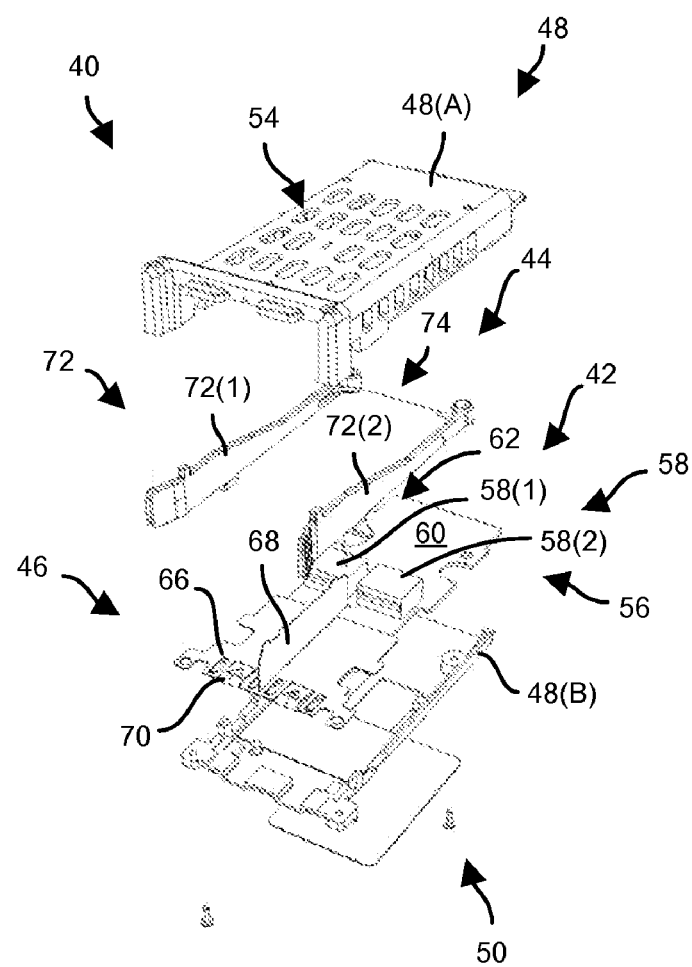
FIG. 2 is an exploded view of the form factor converter of FIG. 1 from a first angle.
Figure 3:
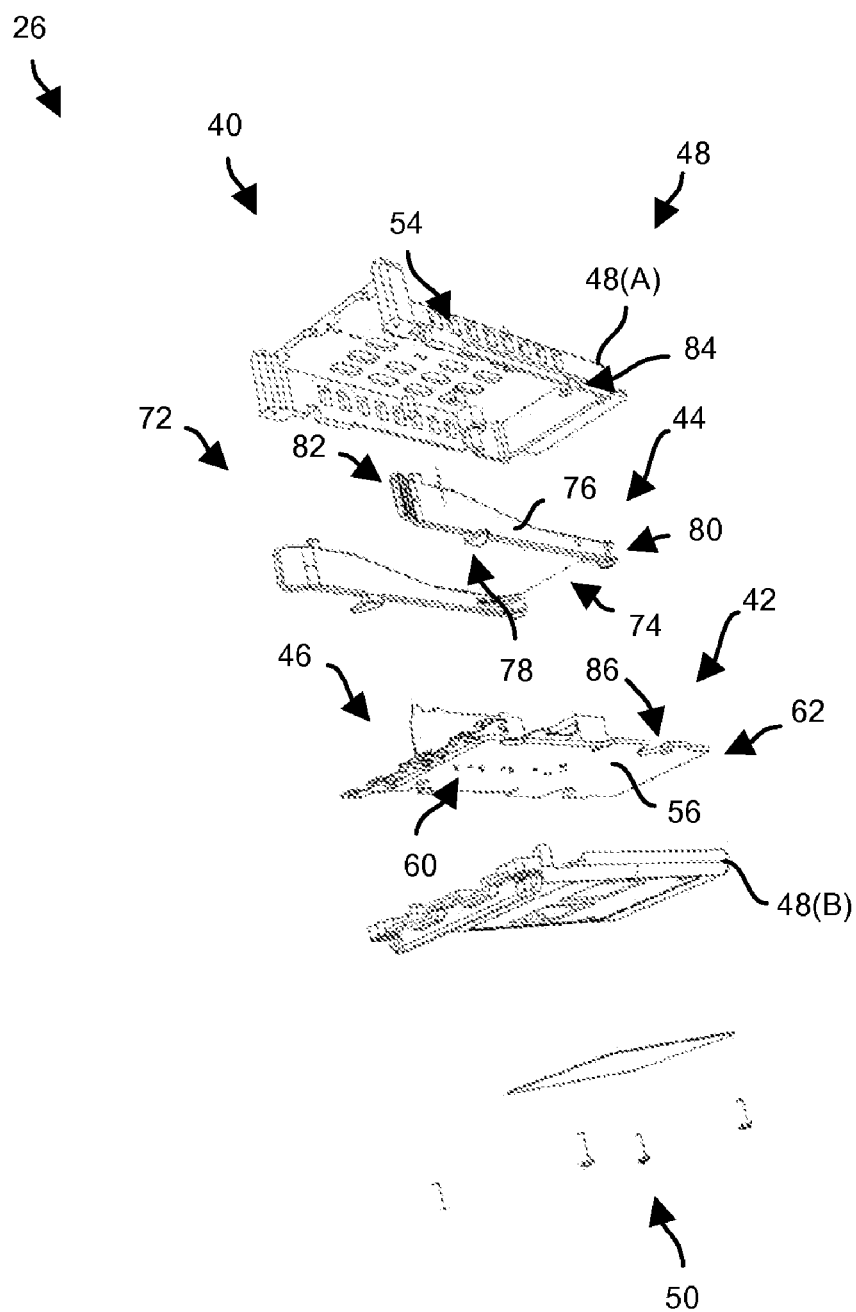
FIG. 3 is an exploded view of the form factor converter of FIG. 1 from a second angle.
Figure 4:
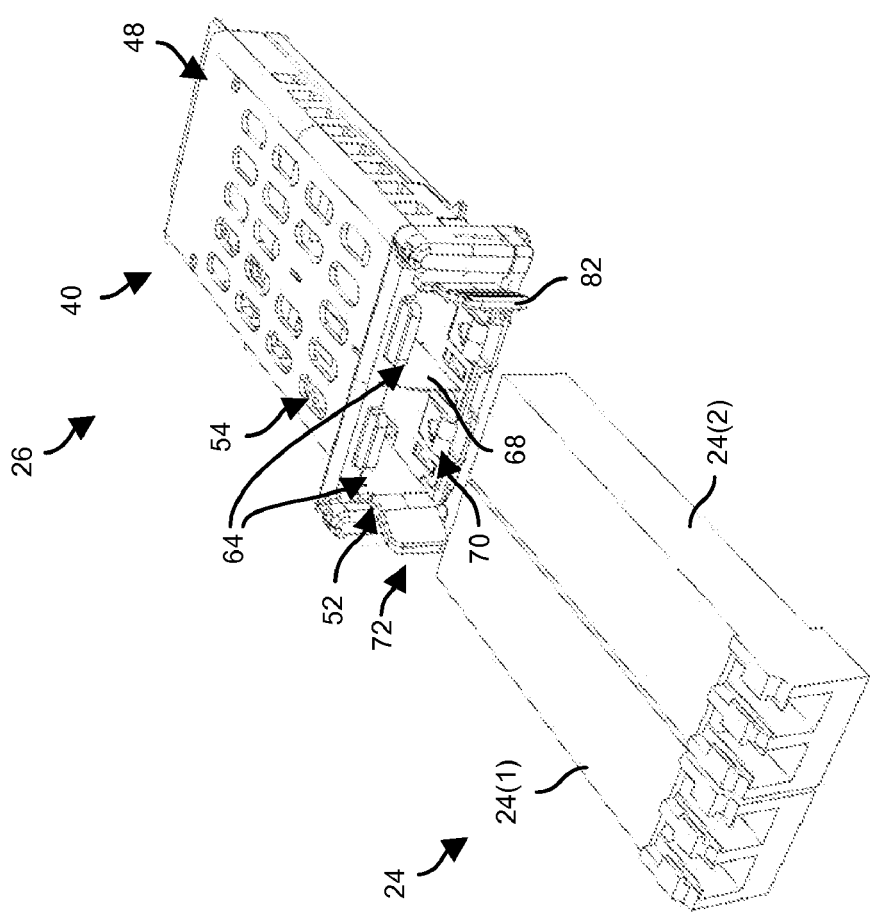
FIG. 4 is a perspective view of the form factor converter of FIGS. 1 through 3 with multiple SFP devices aligned for installation within the form factor converter.

FIGS. 2 and 3 show exploded views of the form factor converter 26. FIG. 4 shows the form factor converter 26 in a constructed state and ready to receive the SFP transceivers 24. As shown in FIGS. 2 and 3, the form factor converter 26 includes a housing 40, a daughter card assembly 42, a locking mechanism 44, and an electromagnetic interference (EMI) separating member 46.

The housing 40 includes housing members 48(A), 48(B) (collectively, housing members 48) and fasteners 50 to hold the housing members 46 together (FIG. 4). The housing 40 defines an internal cavity 52 for holding operating components. Furthermore, the housing members 48(A), 48(B) define vent openings 54 to promote cooling of the operating components, i.e., heat release through the dedicated openings 54. In some arrangements, the housing members 48 are formed of thermally conductive material (e.g., die cast zinc, other metals formed by cast metal technology, stainless steel, injection molded plastic with metallic coatings, combinations thereof, etc.) to improve thermal transfer as well as to provide EMI shielding and to facilitate grounding and electrostatic discharge (ESD) conduction.

The daughter card assembly 42 includes a small circuit board 56, a set of SFP circuit board connectors 58(1), 58(2) (collectively, SFP connectors 58), circuitry 60 (shown generally by the reference numeral 60 in FIGS. 2 and 3). A connecting edge 62 of the small circuit board 56 is configured to connect with the electrical connector 32 of the X2 device mounting section 34 of the circuit board module 22 (FIG. 1).

The daughter card assembly 42 is configured to substantially reside within the internal cavity 52 and to support the EMI separating member 46. In particular, when the EMI separating member 46 is properly positioned relative to the small circuit board 56 of the daughter card assembly 42, the EMI separating member 46 divides the internal cavity 52 into multiple installation locations 64 for connecting to multiple SFP transceivers 24 (see FIG. 4).

It should be understood that a bottom portion 66 of the EMI separating member 46 provides EMI shielding between the installation locations 64 and the small circuit board 56. Furthermore, a middle portion 68 of the EMI separating member 46 provides EMI shielding between the installation locations 64. As a result, when multiple SFP transceivers 24 are in operation within the converter 26, the SFP transceivers 24 do not interfere with each other. In some arrangements, the portions 66, 68 are formed of phosphor bronze material for enhanced EMI shielding. Preferably, the EMI features are made from any thin hard EMI shielding metal, stainless steel, phosphor bronze, beryllium copper, etc. Other materials which are capable of solving EMI/EMR issues are suitable for use as well.

Preferably, the bottom portion 66 defines retainers 70 that facilitate retention of the SFP transceivers 24 within their installation locations 64 (e.g., see detention ramps coupled to the bottom portion 66 of the EMI separating member 46 in FIGS. 2 and 4). Furthermore, when the SFP transceivers 24 reside within the installation locations 64, the retainers 70 operate as EMI gaskets around the SFP transceivers 24.

The locking mechanism 44 of the form factor converter 26 includes a set of actuators 72(1), 72(2) (collectively, actuators 72) and a spring 74. Each actuator 72 (i.e., a tabbed elongated arm) includes an arm portion 76, a tab 78 which extends from the arm portion 76, a pivot end 80 and an actuation end 82. The pivot end 80 of each actuator 72 is captured by a pin 84 of the housing member 48(A) and a circular notch 86 defined by the small circuit board 56 (see FIG. 3) thus enabling that actuator 72 to pivot about the pivot end 80. In some arrangements, the actuators 72 are made from injection molded plastic. In other arrangements, the actuators 72 are made from injection molded plastic and then metallized (e.g., provided with a metallic coating) or are made of metal for EMI shielding purposes.

The spring 74 connects to the actuators 72 at their pivot ends 80 and biases the actuation ends 82 of the actuators 72 away from each other and against the housing 48. During such operation, the tabs 78 protrude through the housing 48 (see FIG. 4). Accordingly, when converter 26 is installed within the X2 device mounting section 34 of the circuit board module 22, the tabs 78 engage the circuit board module 22 (e.g., portions of the rail 30 (also see FIG. 1). However, when the SFP transceivers 24 are not in their installation locations 64, a user is capable of squeezing the actuation ends 82 toward each other to actuate the locking mechanism 44 and thus release the converter 26 from the X2 device mounting section 34. Further details will now be provided with reference to FIGS. 5 and 6.

Figure 5:
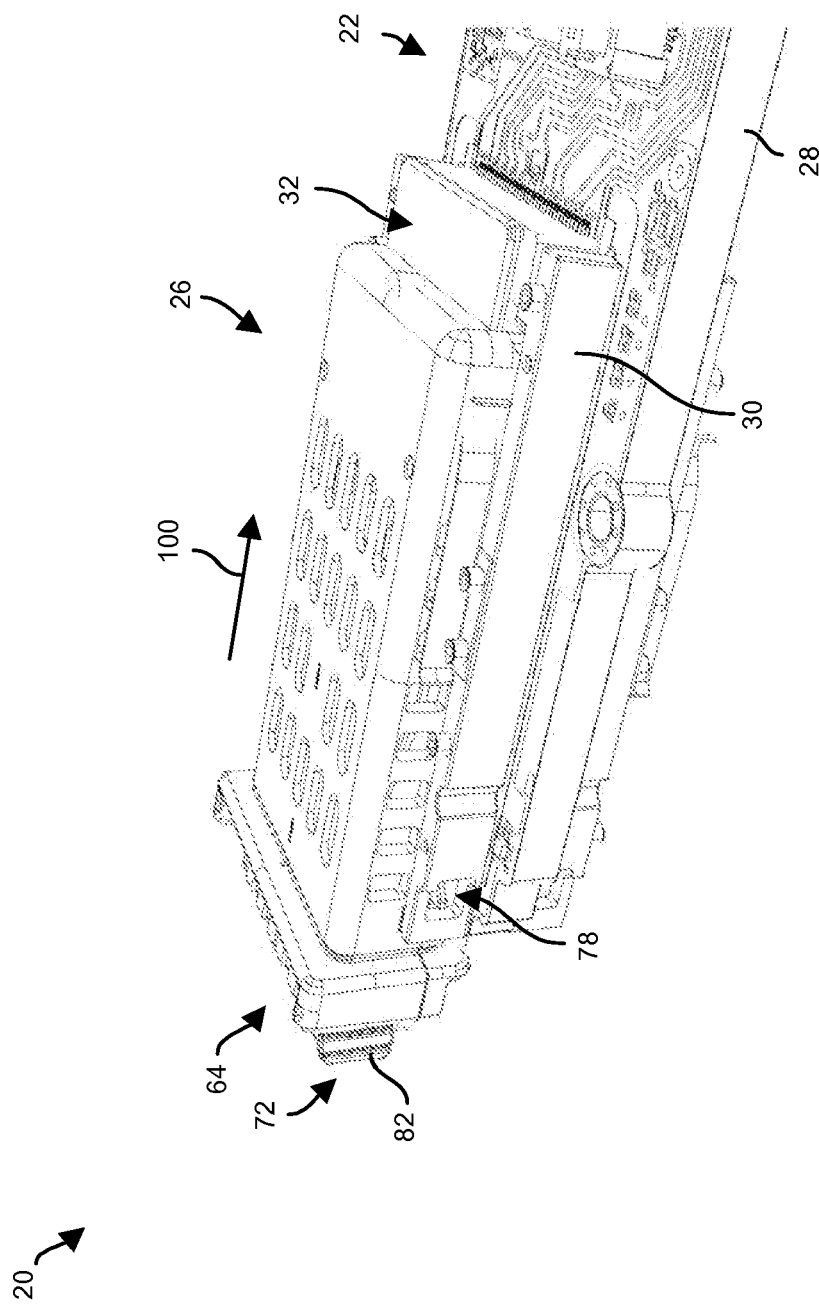
FIG. 5 is a perspective view of the form factor converter attached to the X2 mounting location on the circuit board module of FIG. 1 while the form factor converter is in a locked state.

FIG. 5 shows the form factor converter 26 directly attached to the X2 device mounting section 34 of the circuit board module 22. Here, a user has slid the form factor converter 26 in the direction 100 until the connecting edge 62 (FIGS. 2 and 3) of the small circuit board 56 (i.e., an X2 interface of the form factor converter 26) electrically connects with the electrical connector 32 of the X2 device mounting section 34 of the circuit board module 22 (also see FIGS. 1 and 2). As shown in FIG. 5, the tabs 78 of the actuators 72 are in locking positions and engage the metallic rail 30 thus locking the form factor converter 26 reliably in place.

At this point, the SFP transceivers 24 (FIG. 4) can be inserted into respective installation locations 64. In particular, electrical interfacing portions of the SFP transceivers 24 enter the installation locations 64 and the SFP transceivers are substantially retained in place by the retainers 70 (FIGS. 2 and 4) of the form factor converter 26. Here, an SFP electrical interface of each SFP transceiver 24 electrically connects to a respective SFP circuit board connector 58 thus entering into robust electrical communication with the circuit board module 22 through the daughter card assembly 42. While the SFP transceivers 24 are in the installation locations 64, the SFP transceivers 24 provide mechanical interference which prevents inadvertent actuation of the actuators 72 (i.e., the actuators 72 cannot be moved toward each other so that the tabs 78 disengage from the metallic rail 30, also see FIG. 5). Accordingly, the form factor converter 26 remains robustly in position within the X2 device mounting section 34. As a result, the circuitry 60 of the daughter card assembly 42 operates as an electrical interface by facilitating electrical communications between each SFP transceiver 24 and the X2 device mounting section 34 of the circuit board module 22.

During such operation, the metallic housing 40 of the converter 26 provide EMI shield and ESD grounding to the circuit board module 22. Furthermore, the opening 54 of the housing 40 facilitate heat dissipation from the SFP transceivers 24.

Figure 6:
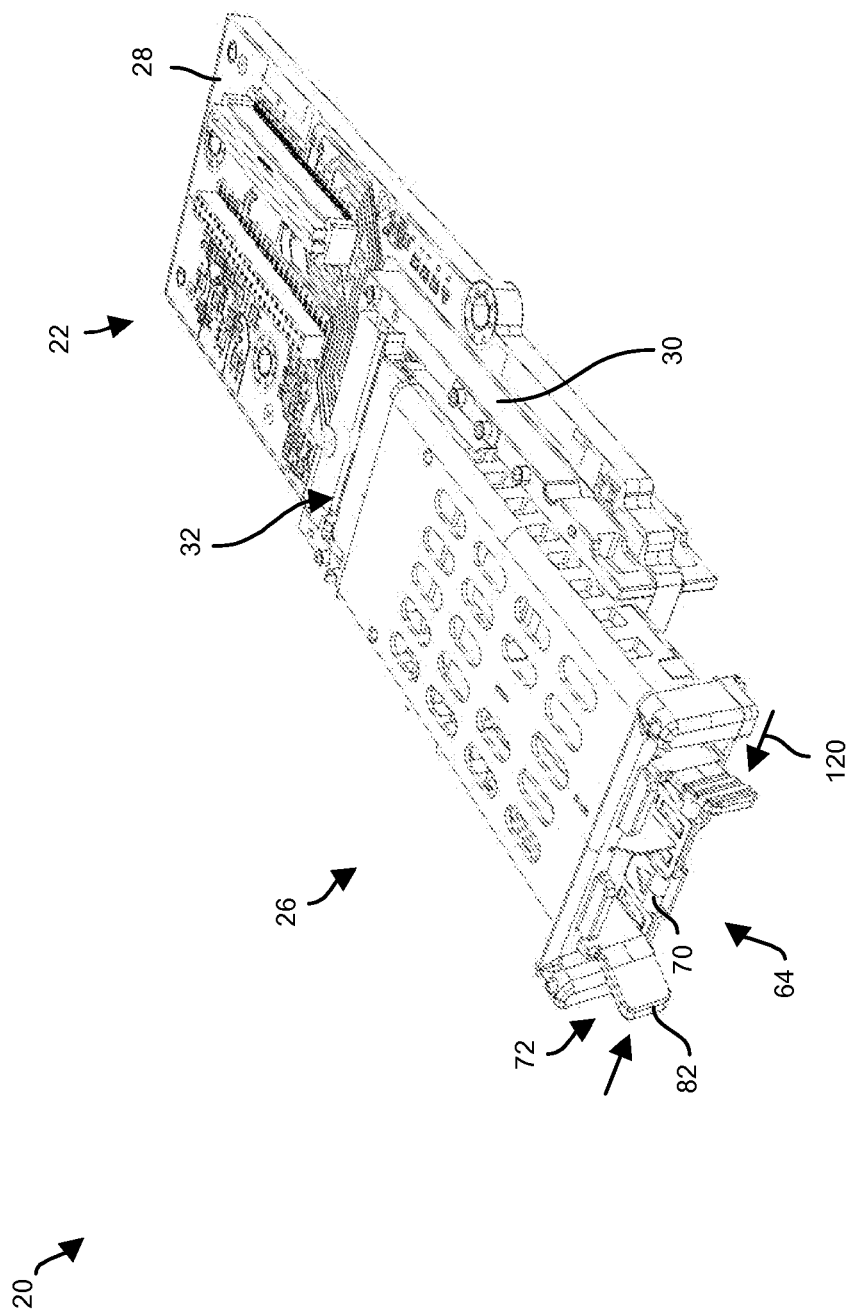
FIG. 6 is a perspective view of the form factor converter attached to the X2 mounting location on the circuit board module of FIG. 1 while the form factor converter is in an unlocked state.

To remove the form factor converter 26 from the X2 device mounting section 34, a user first removes the SFP transceivers 24 from the form factor converter 26 in the direction opposite the direction 100 in FIG. 5 (also see FIG. 6). The user then squeezes the actuation ends 82 of the actuators 72 toward each other (arrows 120) into unlocking positions so that the tabs 78 clear the metallic rail 30. Once the tabs 78 no longer engage the metallic rail 30, the user is capable of sliding the form factor converter 26 out of the X2 device mounting section 34 (i.e., the direction opposite the direction 100 in FIG. 5). Further details will now be provided with reference to FIG. 7.

Figure 7:
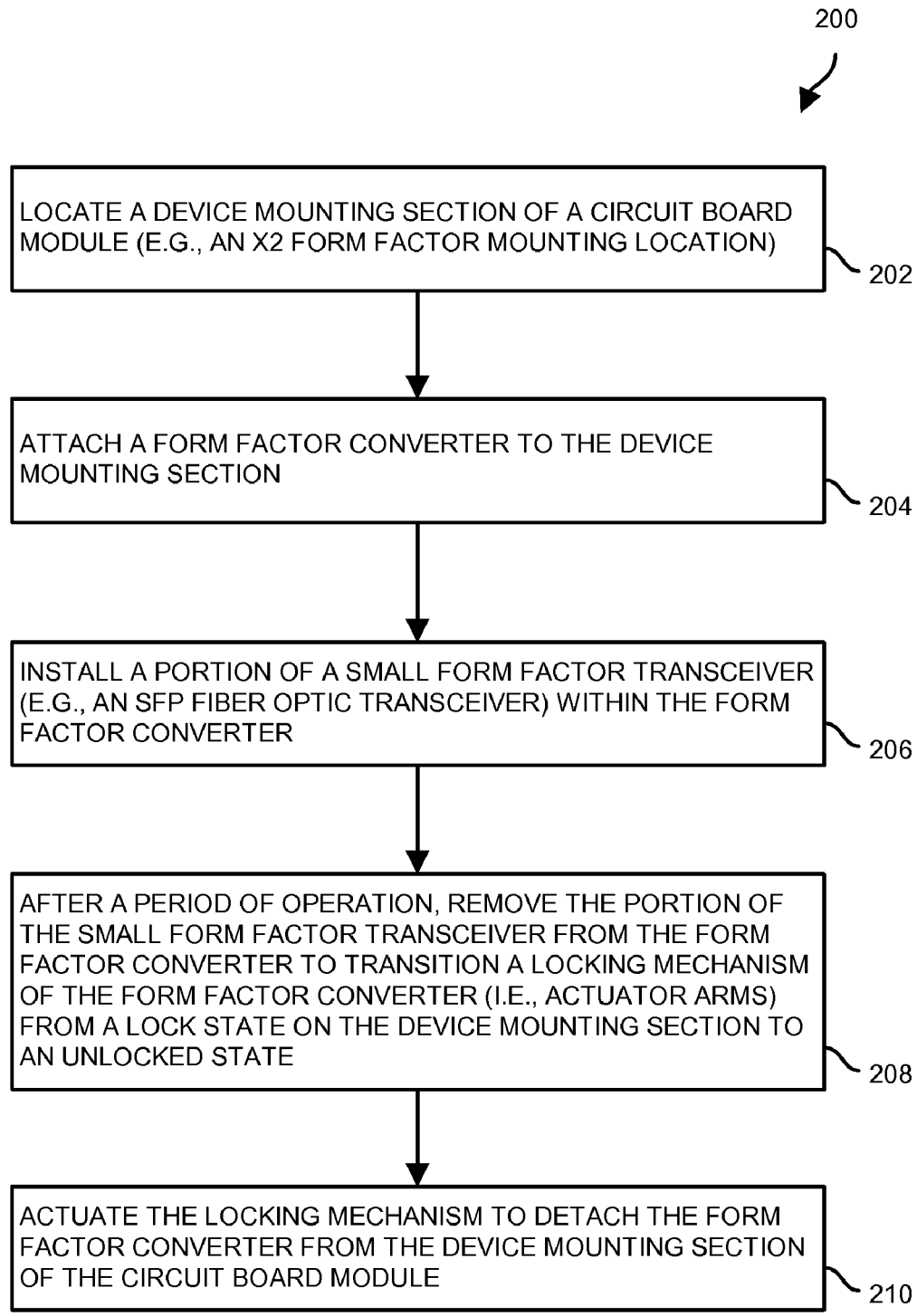
FIG. 7 is a flowchart of a procedure for using the form factor converter of FIG. 1.

FIG. 7 is a flowchart 200 summarizing an installation and removal procedure for the form factor converter 26. In step 202, a user locates the X2 device mounting section 34 of the circuit board module 22 (also see FIG. 1).

In step 204, the user attaches the form factor converter 26 to the device mounting section 34 (also see FIG. 5). At this point, the locking mechanism 44 (FIGS. 2 and 3) reliably hold the converter 26 to the circuit board module 22.

In step 206, the user installs a portion of one or more the SFP transceivers 24 within the form factor converter 26. Multiple SFP transceivers 24 are capable of installing within the form factor converter 26 simultaneously (e.g., see FIGS. 1 and 4). When the SFP transceivers 24 are in their installation locations, the converter 26 is locked in place on the circuit board module 22 (i.e., the converter 26 is in a locked state). At this point, the form factor converter 26 reliably conveys electronic signals between the circuit board module 22 and each SFP transceiver 24.

In step 208, after a period of operation, the user removes the portion each SFP transceiver 24 from the form factor converter 26. Since the SFP transceivers 24 no longer block actuation of the actuators 72, the converter 26 is no longer locked to the circuit board module 22 (i.e., the converter 26 is in an unlocked state).

In step 210, the user actuates the locking mechanism 44 to detach the converter 26 from the circuit board module 22. As a result, the X2 device mounting section 34 is available for use (e.g., for connecting with an X2 device, for re-connecting with the converter 26, etc.).

As described above, a form factor converter 26 couples a small form factor transceiver 24 to a circuit board mounting location 34 which is configured to directly connect to a larger form factor device. For example, such a converter is capable of coupling an SFP device (e.g., an SFP fiber optic transceiver 24) to a standard X2 mounting location. As a result, circuit board modules 22 having one or more large form factor mounting locations can now easily work with smaller form factor standard devices (e.g., SFP fiber optic transceivers 24) even though such mounting locations 34 are configured to directly connect to physically larger form factor standard devices (e.g., X2 fiber optic transceivers).

While various embodiments of the invention have been particularly shown and described, it will be understood by those skilled in the art that various changes in form and details may be made therein without departing from the spirit and scope of the invention as defined by the appended claims.

For example, the actuators 72 were described above as requiring the user to remove the SFP transceivers 24 prior to removal of the form factor converter 26 from the X2 device mounting section 34 by way of example only. In other arrangements, the actuators 72 enable the form factor converter 26 to selectively lock and unlock from the X2 device mounting section 34 regardless of whether SFP transceivers 24 are installed. One suitable way is for the actuators 72 to be implemented as spring-loaded rotatable posts which have tabs similar to the tabs 78. When the user rotates the posts from their locking (i.e., biased) positions to their unlocking positions, the tabs disengage from the metallic rail 30 (or other recess) thus enabling the form factor converter 26 to be removed from the X2 device mounting section 34.

What is claimed is:

1. A form factor converter, comprising:
   an exterior portion defining a large form factor to fit within a device mounting section of a circuit board module when the form factor converter connects to the circuit board module;
   an interior portion defining a small form factor to receive at least a portion of a small form factor transceiver when the form factor converter connects to the small form factor transceiver; and
   circuitry coupled to the exterior portion and the interior portion, the circuitry being configured to operate as an electrical interface between the small form factor transceiver and the circuit board module.

2. A form factor converter as in claim 1 wherein the form factor converter includes:
   a housing which defines at least part of the large form factor and at least part of the small form factor;
   a daughter card assembly coupled to the housing, the daughter card assembly being configured to electrically connect to the circuit board module and a set of small form factor transceivers; and
   a locking mechanism coupled to the housing, the locking mechanism being configured to (i) selectively lock the form factor converter to the device mounting section of the circuit board module, and (ii) release the form factor converter from the device mounting section of the circuit board module.

3. A form factor converter as in claim 2 wherein the locking mechanism includes:
   tabbed elongated arms; and
   a spring coupled to the tabbed elongated arms, the spring being configured to bias the tabbed elongated arms away from each other into locking positions in which tabs of the tabbed elongated arms engage part of the device mounting section of the circuit board module when the exterior portion of the form factor converter is fitted within the device mounting section of the circuit board module, the tabs of the tabbed elongated arms being configured to disengage from the part of the device mounting section of the circuit board module when the elongated arms are moved toward each other from the locking positions to unlocking positions.

4. A form factor converter as in claim 2 wherein the housing defines multiple vent openings to facilitate heat dissipation from the small form factor transceiver when the small form factor transceiver connects to the form factor converter.

5. A form factor converter as in claim 2 wherein the housing includes metallic material to provide electromagnetic interference (EMI) shielding to the small form factor transceiver and electrostatic discharge (ESD) grounding from the small form factor transceiver to the circuit board module.

6. A form factor converter as in claim 2 wherein the daughter card assembly and the locking mechanism are disposed within at least a portion of the housing; and wherein the form factor converter further includes:
   a separating member disposed adjacent the daughter card assembly, the separating member being configured to define multiple installation locations for multiple small form factor transceivers.

7. A form factor converter as in claim 6 wherein the separating member includes:
   metallic material which is constructed and arranged to provide electromagnetic interference (EMI) shielding between the multiple installation locations for the multiple small form factor transceivers.

8. A form factor converter as in claim 2 wherein the exterior portion of the form factor converter defines a first X2 Multi-Source Agreement interface;
   wherein the device mounting section of the circuit board module includes a section of a circuit board, a metallic rail and an electrical connector which form a second X2 Multi-Source Agreement interface configured to electrically connect with the first X2 Multi-Source Agreement interface;

wherein the interior portion of the form factor converter defines a first Small Form-factor Pluggable (SFP) interface; and wherein the small form factor transceiver is an SFP device having a second SFP interface configured to electrically connect with the first SFP interface.

9. A form factor converter, comprising:

an exterior portion defining a large form factor to fit within a device mounting section of a circuit board module when the form factor converter connects to the circuit board module;

an interior portion defining a small form factor to receive at least a portion of a small form factor transceiver when the form factor converter connects to the small form factor transceiver; and means, coupled to the exterior portion and the interior portion, for operating as an electrical interface between the small form factor transceiver and the circuit board module.

* * * * *